United States Patent Office 2,701,789
Patented Feb. 8, 1955

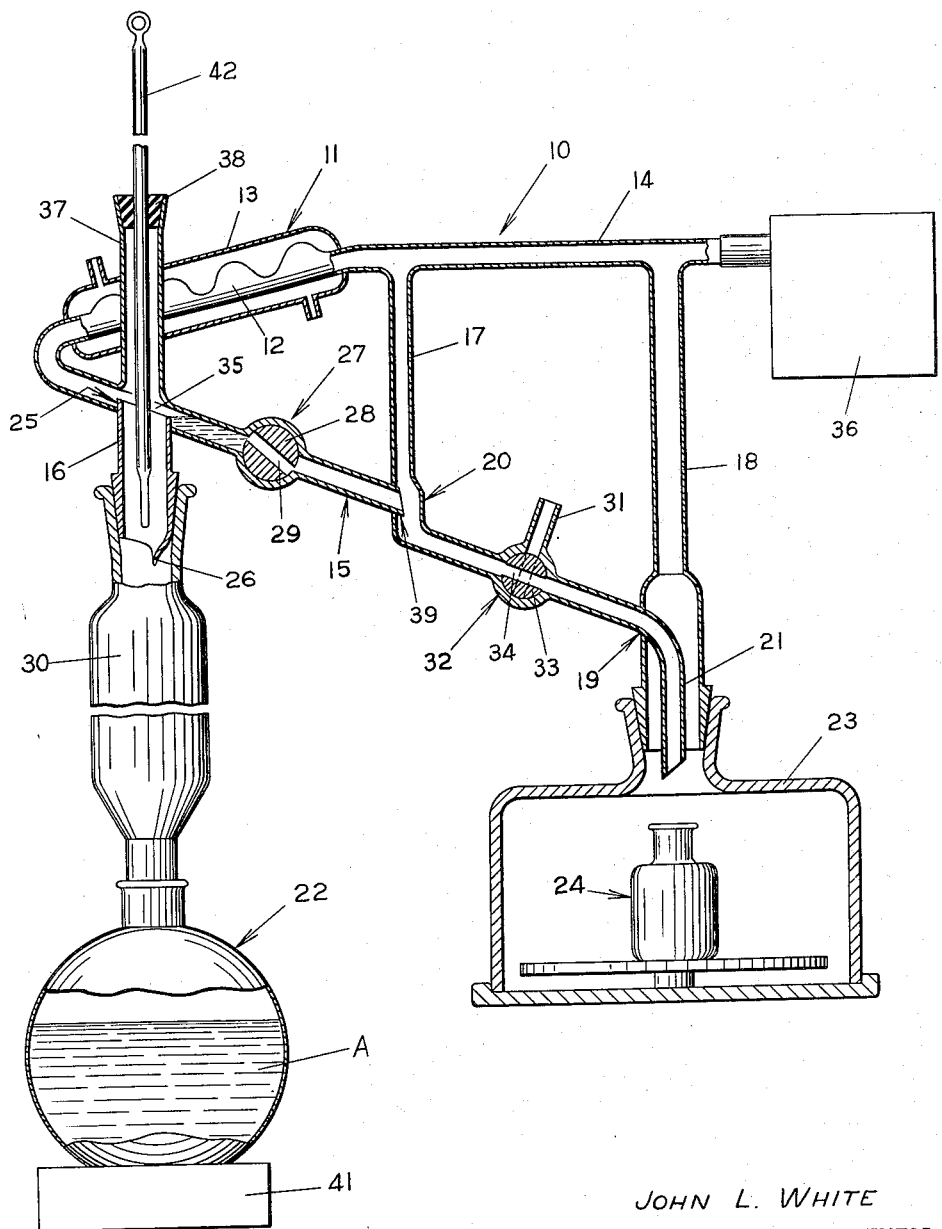

2,701,789

FRACTIONATING DISTILLING HEAD

John L. White, Kalamazoo, Mich., assignor to The Upjohn Company, a corporation of Michigan Application March 19, 1951, Serial No. 216,335

3 Claims. (Cl. 202—161)

This invention relates in general to a distilling head for separating fractions in small amounts under precise conditions of temperature and pressure, and more particularly to a type thereof having means whereby an uncontaminated sample of the distillate may be removed from the head without disturbing said precise conditions.

According to present practices, the distillate of a fractional distillation process must be checked to detect and isolate the different fractions collected during the distillation. Checks based on the refractive index of the distillate have been found far more reliable, particularly for laboratory analysis, than other checks, such as those based on temperature. However, in order to ascertain the refractive index of the distillate, a sample thereof must be obtained. This has in the past necessitated opening of the system, thereby admitting air from atmosphere, which immediately disturbs the precise temperature and pressure conditions which must be maintained in the system for it to function properly. Said air also contaminates the materials being subjected to the distillation process, disturbs the reflux action in the fractionating column and upsets the reflux ratio.

With presently known apparatus, the distillate of a fractional distillation process is collected in a plurality of receptacles, after which the process is interrupted and the distillate in each receptacle is tested for its index of refraction. Frequently, a substantial number of such receptacles are found to contain more than one fraction so that the contents of these receptacles must be redistilled. This problem is, of course, in addition to the above mentioned problems arising from the interruption of the process and opening of the system. In short, present methods and equipment for separating fractions by distillation are not satisfactory, especially where the refractive index of the distillate must be checked.

It has long been desirable to provide a fractional distillation apparatus from which samples of the distillate can be removed periodically, as desired, without interrupting the distillation proceedings. A check of these samples, as by their refractive index, would indicate immediately the progress of the distillation and the nature of the distillate. Accordingly, the separation and collection of the fractions could be conducted far more accurately and efficiently than presently possible.

Therefore, a primary object of this invention is the provision of a distilling head for separating fractions in small amounts under precise conditions of temperature and pressure whereby samples of the distillate can be removed without effecting any appreciable change in the precise temperature and pressure conditions normally required in such a process, and without necessitating an interruption in the separation process.

A further object of this invention is the provision of a distilling head, as aforesaid, having means whereby small samples of said distillate can be removed without contamination thereof by residue from previous samples removed in the same manner.

A further object of this invention is the provision of a head, as aforesaid, whereby separation of fractions can be accomplished at a faster rate and more accurately than previously possible under similar conditions due to the elimination both of said contamination and the collection of distillate of doubtful utility.

Other objects of this invention will become apparent upon reading the following specification and examining the accompanying drawing, which drawing illustrates a substantially vertical and central cross-section of an apparatus embodying my invention.

For purposes of convenience in description, the terms "left," "right," "inner," "outer," "upper" and "lower," and derivatives thereof, may be used herein and will have reference to the apparatus as appearing in the drawing.

General construction

In meeting the objects mentioned above, I have provided a one piece distilling head comprising a reflux condenser connected at its lower end to a downwardly sloping drain pipe. A reflux pipe communicates with, and extends downwardly from, the drain pipe adjacent to the condenser. A by-pass pipe communicates between the upper end of the condenser and said drain pipe, intermediate the lower end thereof and said reflux pipe. A device for metering the flow of fluid through the drain pipe is placed therein between the reflux and by-pass pipes. A sampling device is associated with the drain pipe between the lower end thereof and the by-pass pipe. A pressure control means is associated with the by-pass pipe, near the condenser, and the lower end of the drain pipe.

The reflux pipe and the lower end of the drain pipe communicate, respectively, with separate receptacles in an air tight connection in a preferred use of the apparatus. For illustration purposes, only, the system provided by the said apparatus is assumed to be under sub-atmospheric pressure conditions.

Detailed construction

As shown in the drawing, the distilling head 10, in this particular embodiment of the invention, is comprised of a reflux condenser 11 having an inner tube 12, sloped with respect to the horizontal, and a water jacket 13. The upper end of the inner tube 12 is provided with an extension 14, which is preferably horizontal. A drain pipe 15, which is inclined to the horizontal and has a vertical offset 20 intermediate its ends, communicates at its upper end with the lower end of the inner tube 12. The condenser 11 is displaced laterally of the vertical plane defined by the drain pipe 15. The drain pipe 15 is laterally enlarged at 35 adjacent to the condenser 11 for reception thereinto of the upper end 25 of a preferably vertical reflux pipe 16, which is open at both ends. A by-pass pipe 17 communicates at one end with the extension 14, adjacent to the condenser 11, and communicates at its other end with the drain pipe 15 at said offset 20 therein.

A pressure control pipe 18, which is preferably substantially upright, communicates at its upper end with the extension 14 near the rightward, or free, end thereof and is open at both ends. The lower end of the drain pipe 15 extends through an opening 19 in the sidewall of the control pipe 18 near the lower end thereof and is secured to the wall of said opening. The lower end of the drain pipe 15 may be provided with a portion 21 disposed within the control pipe 18, spaced from the sidewalls thereof and extending through the lower end thereof. The reflux pipe 16 is associated in an air-tight connection with a conventional fractionating column 30, which is connected at its lower end to the still 22. The lower end of the control pipe 18 is associated in air-tight connection with a receiver, such as the bell jar 23, containing receptacles 24 in which the fractions are collected.

A metering device 27 is disposed in the drain pipe 15 intermediate the reflux pipe 16 and the by-pass pipe 17 to provide a controllable restriction to the passage of distillate through this portion of the drain pipe. In this particular embodiment, the metering device is comprised of a metering valve 28 having an opening 29 therethrough alignable in one position of said valve with the passageway in the adjacent portions of the drain pipe 15. Accordingly, the amount of fluid permitted to flow through the opening 29 in the valve 28 may be controlled by appropriate rotational positioning of said valve.

The upper end 25 of the reflux pipe 16 extends a short distance into the portion 35 of the drain pipe 15 to form a dam causing the condensate to by-pass the reflux pipe as it flows from the condenser 11 to the metering device 27, thereby effecting control of the reflux ratio in a substantially conventional manner.

That portion of the drain pipe 15 leftwardly and upwardly of the offset 20 therein is provided with a drip lip 39 extending into the chamber defined by said offset. Another drip lip 26 is provided at the lower end of the reflux pipe 16. These two lips provide means for checking the reflux ratio.

An access pipe 31, which is substantially upright and open at both ends, communicates at its lower end with the drain pipe 15 intermediate the by-pass pipe 17 and the control pipe 18. A sampling device 32, having a sampling valve 33, is disposed in the drain pipe 15 at the junction thereof with the access pipe 31. The sampling valve 33 is preferably provided with a cylindrical opening 34 therethrough which, when in the solid line position, is aligned with the passageway in the adjacent portions of the drain pipe 15. When the valve 33 is rotated approximately 90°, so that said opening 34 is in the broken line position, said opening 34 is aligned with the opening in the access pipe.

A pressure control means 36 such, for example, as a vacuum pump, may be connected to the free end of the extension 14 for effecting the necessary control over the pressure conditions within the distilling head 10.

A thermometer well 37, which is open at both ends, communicates with the drain pipe 15 at 35 to form a junction therewith and is preferably co-axial with, and extends upwardly from, the reflux pipe 16. A thermometer 42 may be held in the well 37 by means of a stopper 38 in a conventional, air-tight manner.

An accurately controllable heating means 41, as an oil bath, is preferably provided under the still 22 for heating same at a temperature controllable within a desired range.

Operation

With the apparatus assembled substantially as shown in the drawing, a sub-atmospheric pressure will be maintained by pressure control means 36 within the distilling head 10. The raw fluid in the still 22 may be distilled and fractionated in a conventional manner, with the reflux returning to the column 30 and the distillate collecting in the drain pipe 15 between the metering device 27 and the reflux pipe 16. The reflux ratio may be established, as desired, by controlling the metering device 27 and comparing the drops from the drip lips 26 and 39.

As is common knowledge in this field, the reflux action within the column 30 will tend to increase the purity of the fraction in the condensate being collected in the pipe 15 adjacent to the leftward side of the metering mechanism 27 until said condensate contains a high concentration of a particular fraction. Thus, as the process proceeds the distillate tends to contain substantially a single fraction, which fraction flows through the metering mechanism 27, the cylindrical opening 34 in the sampling valve 33 and, eventually, into the receptacle 24.

When, as may be indicated by the thermometer 42, it becomes desirable to check the fraction being separated from the fluid A, the sampling valve 33 is turned from its solid position to its broken line position. A capillary tube of any convenient type and length is inserted through the opening in the access pipe 31 to remove the fluid trapped in the cylindrical opening 34 in the valve 33. As soon as this sample is removed, the valve 33 is turned so that the opening 34 therein is again in the solid line position. If, during this time, any appreciable amount of distillate accumulates adjacent to the closed sampling valve 33, it is permitted to back up in the drain pipe 15, as well as the by-pass pipe 17, thereby preventing flooding and/or an interruption in the fractionating process.

Further, while the valve 33 is in said dotted line position, the by-pass pipe 17 prevents the creation of a difference in pressure on the right side of the metering mechanism 27 which would cause a blow-back through the metering valve, thereby disturbing the distillate on the leftward side thereof. Such a blow-back would destroy the reflux ratio, thereby decreasing the purity of the distillate, and would disturb the fluid within the column 30 which contains a purer fraction than the raw fluid A.

As the valve 33 is moved from the solid line position to the broken line position, a film of the distillate is deposited upon the sidewall of the sampling mechanism 32, in which the valve 33 is seated. However, as the valve 33 is rotated back to the solid line position, the trailing edge of the opening 34 will tend to remove such film from said wall. Any amount of residue remaining after this return movement will be spread out so thin as to have negligible effect upon later samples. Further, since the cylindrical opening 34 becomes a part of the drain pipe passageway when in the solid line position, any traces of residue of this particular sample are soon washed therethrough with the distillate immediately following the taking of said sample. Since this distillate has substantially the same characteristics as said sample, the chance of contamination of succeeding samples is substantially eliminated and each sample will be a substantially accurate representation of the distillate then falling from the drip lip 39.

The amount of air which will be trapped within the cylindrical opening 34, when it is rotated from the broken line position to the solid line position, is inconsequential in its effect upon the pressure or temperature within the system and has no measurable contaminating effect. However, should there still be any concern over contamination, it can be easily overcome by permitting the distillate to collect back of said sampling valve until the passageway is closed and then turning the sampling valve so that the air trapped therein is washed with the distillate into a separate, waste receptacle positioned in place of the receptacle 24. This operation will require only a few seconds longer than the sampling operation during which a certain amount of distillate will be collecting leftwardly of the sampling valve in any case.

It will be noted that the distilling and fractionating process including the reflux ratio will, during such process, be undisturbed, and the pressure and temperature within the distilling head 10, within the still 22 and within the bell jar 23 will remain substantially identical before, during and after a sampling operation.

Although the above mentioned drawing and description apply to one particular, preferred embodiment of the invention, it will be recognized that variations and modifications of the specific apparatus may be made entirely within the scope of the invention unless specifically stated to the contrary in the hereinafter appended claims.

I claim:

1. In laboratory distilling apparatus particularly adapted for permitting the withdrawal of samples therefrom without materially altering the pressure within the apparatus relative to the external pressure, the combination: reflux condenser including an inner conduit, a downwardly sloping drain pipe communicating at its upper end with the discharge end of said inner conduit, means equalizing the pressure within said inner conduit and said drain pipe, a reflux pipe communicating with said drain pipe adjacent to said condenser, a by-pass pipe communicating between the inlet end of said inner conduit and said drain pipe at a point intermediate the ends thereof; a stationary valve body connected in said drain pipe, said valve body having an inlet and an outlet coaxial with each other on opposite sides of said valve body and a sampling opening positioned on the upper side of said body, extending upwardly, and on an axis substantially perpendicular to the common axis of said inlet and said outlet; a movable valve member within said valve body and manually rotatable on a substantially horizontal axis, said movable valve member having a single straight passageway positioned diametrically therethrough and being of substantially the same internal diameter as both said inlet and outlet openings and said sampling opening, and said movable member in one position thereof causing said passageway to connect said inlet opening and said outlet opening to each other and said movable member isolating the sampling opening from said inlet and said outlet openings, and said movable member in another position thereof causing said passageway to communicate with said sampling opening for providing a reservoir open to the atmosphere of material to be sampled and said movable member isolating said inlet and outlet openings from each other and from the atmosphere.

2. In laboratory distilling apparatus particularly adapted for permitting the withdrawal of samples therefrom without materially altering the pressure within the apparatus relative to the external pressure, the combination: reflux condenser including an inner conduit, a downwardly sloping drain pipe communicating at its upper end with the discharge end of said inner conduit, means regulating the pressure within said inner conduit and said drain pipe, a stationary valve body connected in said drain pipe between the ends thereof, said valve body having an inlet opening and an outlet opening coaxial with each other on opposite sides of said valve body and a sampling opening positioned on the upper side of said body, extending upwardly, and on an axis substantially perpendicular to the common axis of said inlet opening and said outlet opening, all of said openings being of substantially the same diameter as the internal diameter of said drain pipe; a movable valve member within said valve body and rotatable on substantially a horizontal axis, said movable valve member having a single straight passageway positioned diametrically therethrough and being of substantially the same internal diameter as both said drain pipe and said sampling opening, and said movable member in one position thereof causing said passageway to connect said inlet opening and said outlet opening to each other and said movable member isolating the sampling opening from said inlet and said outlet openings, and said movable member in another position thereof causing said passageway to communicate with said sampling opening for providing a reservoir open to the atmosphere of material to be sampled and said movable member isolating said inlet and outlet openings from each other and from the atmosphere.

3. In laboratory distilling apparatus particularly adapted for permitting the withdrawal of samples therefrom without materially altering the pressure differential within the apparatus relative to the external pressure, said distilling apparatus including a downwardly sloping drain pipe providing a passageway for the condensed distillate between the area of condensation and means for collecting the condensed distillate, pressure means for controlling the pressure within said distilling apparatus, means including a pressure control pipe for providing communication between the area of condensation and both the means for collecting the condensed distillates and said pressure means; the combination comprising a stationary valve body connected in said drain pipe, said valve body having an inlet and an outlet coaxial with each other on opposite sides of said valve body and a sampling opening positioned on the upper side of said body, extending upwardly, and on an axis substantially perpendicular to the common axis of said inlet and said outlet; a movable valve member within said valve body and manually rotatable on a substantially horizontal axis, said movable valve member having a single straight passageway positioned diametrically therethrough and being of substantially the same internal diameter as both said inlet and outlet openings and said sampling opening, and said movable member in one position thereof causing said passageway to connect said inlet opening and said outlet opening to each other and said movable member isolating the sampling opening from said inlet and said outlet openings, and said movable member in another position thereof causing said passageway to communicate with said sampling opening for providing a reservoir open to the atmosphere of material to be sampled and said movable member isolating said inlet and outlet openings from each other and from the atmosphere.

References Cited in the file of this patent

UNITED STATES PATENTS

| | | |
|---|---|---|
| 1,448,709 | Schulze | Mar. 13, 1923 |
| 1,562,121 | Newton | Nov. 17, 1925 |
| 2,275,648 | Podbilniak | Mar. 10, 1942 |
| 2,427,142 | Horbacker et al. | Sept. 9, 1947 |
| 2,450,715 | Campbell | Oct. 5, 1948 |
| 2,476,477 | Berg | July 19, 1949 |
| 2,537,942 | Martin | Jan. 9, 1951 |

OTHER REFERENCES

Ind. and Eng. Chem., Anal. Ed., vol. 18 (1946), pages 673 to 677.

Ind. and Eng. Chem., Anal. Ed., vol. 13 (1941), pages 487 to 491.

Ind. and Eng. Chem., Anal. Ed., vol. 14 (1942), pages 493 to 496.

Zimmerman: Ind. and Eng. Chem., Anal. Ed., vol. 17 (1945), p. 815.

Laboratory Fractional Distillation, by Carney, MacMillan, 1949, pages 124, 125 and 212.